J. H. WAGENHORST.
WHEEL AND RIM.
APPLICATION FILED JAN. 25, 1919.
1,366,042. Patented Jan. 18, 1921.
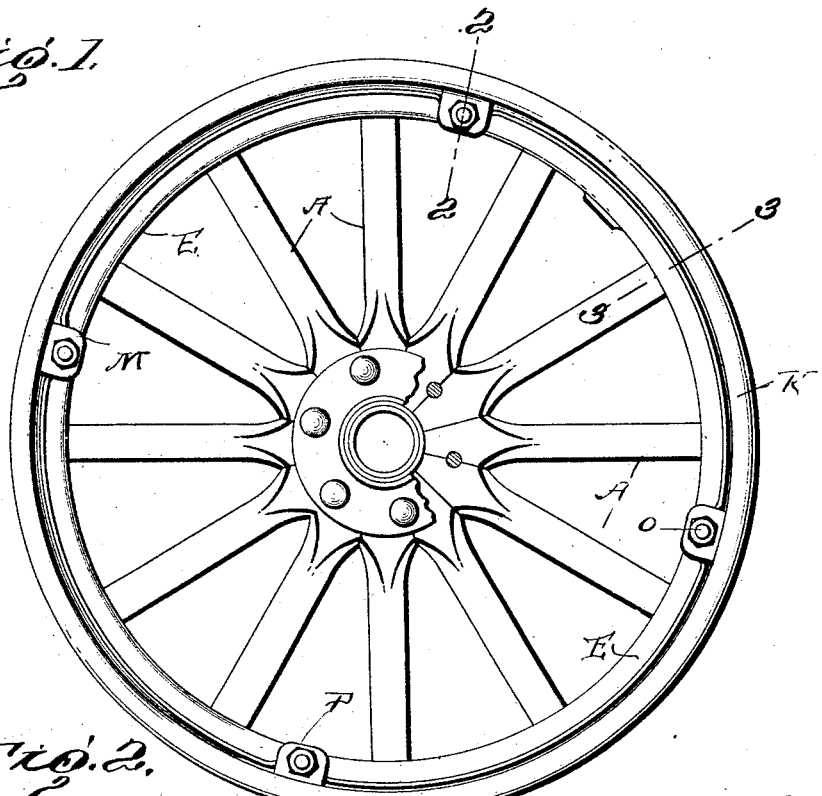
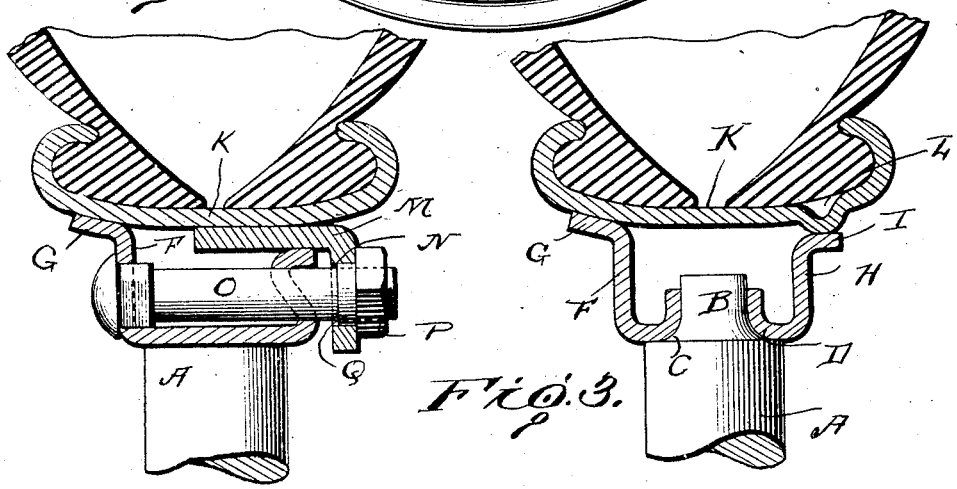

UNITED STATES PATENT OFFICE.

JAMES H. WAGENHORST, OF AKRON, OHIO.

WHEEL AND RIM.

1,366,042.  Specification of Letters Patent.  Patented Jan. 18, 1921.

Application filed January 25, 1919. Serial No. 272,990.

*To all whom it may concern:*

Be it known that I, JAMES H. WAGENHORST, a citizen of the United States, residing at Akron, in the county of Summit and State of Ohio, have invented a certain new and useful Improvement in Wheels and Rims, of which the following is a full, clear, and exact description, reference being had to the accompanying drawings.

This invention relates generally to automobile wheels and more particularly to one provided with a demountable tire carrying rim, and the object of the present invention is to provide a novel construction of wheel body and also novel means for connecting the demountable tire carrying rim to said wheel body, and with these objects in view, and certain others which will become apparent as the description proceeds, the invention consists in certain novel features of construction and in the manner in which they are combined or arranged, all of which will be fully described hereinafter and set forth in the appended claims.

In the drawings forming a part of this specification I have shown one embodiment of my invention and in which Figure 1 is a side elevation of a wheel body and rim constructed in accordance with my invention.

Fig. 2 is a detail sectional view on the line 2—2 of Fig. 1, and

Fig. 3 is a similar view on the line 3—3 of Fig. 1, the spoke being shown in elevation.

In constructing a wheel body in accordance with my invention I employ a plurality of wooden spokes A, the inner ends of which are shaped to provide the central portion of the wheel body and their outer ends are preferably tenoned as shown at D, there being a curved fillet C at the base of each tenon.

These spoke tenons B are projected through openings D formed in the base of a sheet metal fixed rim E. The edges of the openings are rounded as shown to provide a reinforcement or firmer bearing for the tenons. The fixed rim is constructed with an inner leg F terminating in the rim receiving flange G, and the fixed rim is also constructed with an outer leg H of less height than the inner leg F and which terminates in a rim supporting flange I. The tire carrying rim K may be either straight side or clencher and the inner portion of its base is adapted to seat upon the flange G and this rim K is formed with an in-rolled bead L which contacts or nearly contacts with the flange I.

In order to fasten this demountable tire carrying rim upon the fixed rim and also to provide a driving connection between the tire carrying rim and wheel body I employ a plurality of angular lugs M, one member of which is welded or riveted to the base of the tire carrying rim, while the other member thereof extends inwardly toward the center of the wheel, and is adapted to rest substantially parallel with the outer leg of the fixed rim and this inwardly projecting member has an opening M, produced therein to fit over the outwardly projecting end of the bolt O which passes transversely through the fixed rim from the inner side thereof, and is held in said fixed rim against rotation and it will be noted that the opening N is somewhat larger than the end of bolt O so that the lugs can be readily slipped on and off said bolts. P indicates a nut which is threaded upon the end of the bolt and which is provided with an inwardly extending shoulder Q which takes up the clearance due to the bolt opening N being larger than the bolt O.

Where the lugs M are attached to the tire carrying rim, the bead L is flattened out or cut away and the outer leg H and flange I is pressed inwardly opposite each lug a distance equal to the thickness of the lug so that at all points between the lugs the bead L can rest upon the flange I and in this manner a continuous contact along both the inner and outer flanges is obtained, it being obvious that as the nut is tightened up on the bolt, the lug and the tire carrying rim will be forced inwardly and as the tire carrying rim rides upon the flange G the rim will be tensioned upon that side and at the same time the lugs will be drawn down firmly upon the impressed portions of the flange I and the bead L will be caused to contact firmly upon the remaining portions of the flange I. As the outer leg H is of less height than the inner leg F the tire carrying rim can be quickly and easily moved on and off the fixed rim.

By having the bolts rigid with the fixed rim and the lugs of the tire carrying rim secured thereon it is obvious that the rim carrying the tire is securely fastened upon the fixed rim and that a driving connection is obtained between the wheel body and the tire carrying rim, and furthermore as the lugs engage the inpressed portions of the flange and leg they also assist in the holding of the rim carrying the tire against any possible circumferential movement upon the fixed rim.

The fixed rim being of sheet metal and having differential legs coöperates efficiently with a tire carrying rim having an inrolled bead and fastening lugs.

What I claim is:—

1. The combination with a fixed rim of sheet metal having differential legs, of a tire carrying rim having an inrolled bead, and a plurality of apertured lugs connected to said tire carrying rim, bolts passing transversely through the fixed rim and adapted to pass through the apertures of said lugs and nuts upon the ends of said bolts.

2. The combination with a wheel body having a fixed rim of sheet metal, the legs of said fixed rim being of different heights, of a tire carrying rim having an inrolled bead adapted to engage the leg of less height, apertured lugs rigidly connected to the base of the tire carrying rim, transverse bolts passing through the fixed rim, the apertures in the lugs being of a diameter considerably greater than the diameter of the transverse bolts, and nuts having shouldered inner portions, as set forth.

3. The combination with a fixed rim having differential legs, a plurality of bolts passing transversely through said fixed rim, a tire carrying rim having an inrolled bead, a plurality of apertured lugs rigidly connected to the base of the demountable tire carrying rim, said apertured lugs being adapted to fit over the projecting ends of the bolts, there being clearance between lugs and bolts, and nuts arranged upon the ends of the bolts, said nuts being shouldered to occupy such clearance, the leg of the fixed rim being pressed inwardly at points where the bolts pass through said fixed rim.

4. The combination with a fixed rim of sheet metal having differential legs, the outer leg of said rim having depressions therein, of a tire carrying rim having an inwardly projecting bead, and a plurality of apertured lugs connected to said tire carrying rim, bolts passing through said fixed rim and lugs, nuts upon the ends of said bolts, said lugs engaging the depressions in said fixed rim.

5. The combination with a fixed rim of sheet metal having differential legs, of a tire carrying rim having an inwardly projecting bead, and a plurality of apertured lugs connected to said tire carrying rim, bolts passing transversely through the fixed rim and adapted to pass through the apertures of said lugs, and nuts upon the ends of said bolts.

In testimony whereof, I hereunto affix my signature.

JAMES H. WAGENHORST.